(12) United States Patent
Choe et al.

(10) Patent No.: US 11,704,913 B2
(45) Date of Patent: Jul. 18, 2023

(54) METHOD FOR AUTOMATICALLY LABELING OBJECTS IN PAST FRAMES BASED ON OBJECT DETECTION OF A CURRENT FRAME FOR AUTONOMOUS DRIVING

(71) Applicant: Baidu USA LLC, Sunnyvale, CA (US)

(72) Inventors: Tae Eun Choe, Sunnyvale, CA (US); Guang Chen, Sunnyvale, CA (US); Weide Zhang, Sunnyvale, CA (US); Yuliang Guo, Sunnyvale, CA (US); Ka Wai Tsoi, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 500 days.

(21) Appl. No.: 16/460,192

(22) Filed: Jul. 2, 2019

(65) Prior Publication Data

US 2021/0004643 A1    Jan. 7, 2021

(51) Int. Cl.
*G06V 20/56* (2022.01)
*G06V 20/58* (2022.01)
*G06F 18/28* (2023.01)
*G06F 18/214* (2023.01)
*G06V 10/82* (2022.01)

(52) U.S. Cl.
CPC .......... *G06V 20/588* (2022.01); *G06F 18/214* (2023.01); *G06F 18/28* (2023.01); *G06V 10/82* (2022.01); *G06V 20/58* (2022.01); *G06V 20/582* (2022.01); *G06V 20/584* (2022.01)

(58) Field of Classification Search
None
See application file for complete search history.

(56) References Cited

U.S. PATENT DOCUMENTS

| | | | |
|---|---|---|---|
| 10,169,680 B1 * | 1/2019 | Sachdeva | G06F 3/04845 |
| 2017/0343362 A1 * | 11/2017 | Shen | G06T 15/205 |
| 2018/0348781 A1 * | 12/2018 | Zheng | G05D 1/0088 |

OTHER PUBLICATIONS

Leibe, Bastian, et al. "Coupled object detection and tracking from static cameras and moving vehicles." IEEE transactions on pattern analysis and machine intelligence 30.10 (2008): 1683-1698. (Year: 2008).*

(Continued)

*Primary Examiner* — Samah A Beg
(74) *Attorney, Agent, or Firm* — Womble Bond Dickinson (US) LLP

(57) ABSTRACT

A list of images is received. The images were captured by a sensor of an ADV chronologically while driving through a driving environment. A first image of the images is identified that includes a first object in a first dimension (e.g., larger size) detected by an object detector using an object detection algorithm. In response to the detection of the first object, the images in the list are traversed backwardly in time from the first image to identify a second image that includes a second object in a second dimension (e.g., smaller size) based on a moving trail of the ADV represented by the list of images. The second object is then labeled or annotated in the second image equivalent to the first object in the first image. The list of images having the labeled second image can be utilized for subsequent object detection during autonomous driving.

20 Claims, 11 Drawing Sheets

(56) References Cited

OTHER PUBLICATIONS

Xiang, Yu, Alexandre Alahi, and Silvio Savarese. "Learning to track: Online multi-object tracking by decision making." Proceedings of the IEEE international conference on computer vision. 2015. (Year: 2015).*

Hadsell, Raia, et al. "Online learning for offroad robots: Using spatial label propagation to learn long-range traversability." Proc. of Robotics: Science and Systems (RSS). vol. 11. 2007. (Year: 2007).*

* cited by examiner

METHOD FOR AUTOMATICALLY LABELING OBJECTS IN PAST FRAMES BASED ON OBJECT DETECTION OF A CURRENT FRAME FOR AUTONOMOUS DRIVING

TECHNICAL FIELD

Embodiments of the present disclosure relate generally to operating autonomous vehicles. More particularly, embodiments of the disclosure relate to automatically labeling objects of past frames based on objection detection of a current frame.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Perception is a critical operation in autonomous driving. In order to efficiently and accurately autonomously drive a vehicle, an autonomous driving system has to be trained based on a set of training data such as images with known annotated objects. Normally, such annotation requires tedious manual processes. There has been a lack of efficient ways for labeling objects for training an autonomous driving system.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
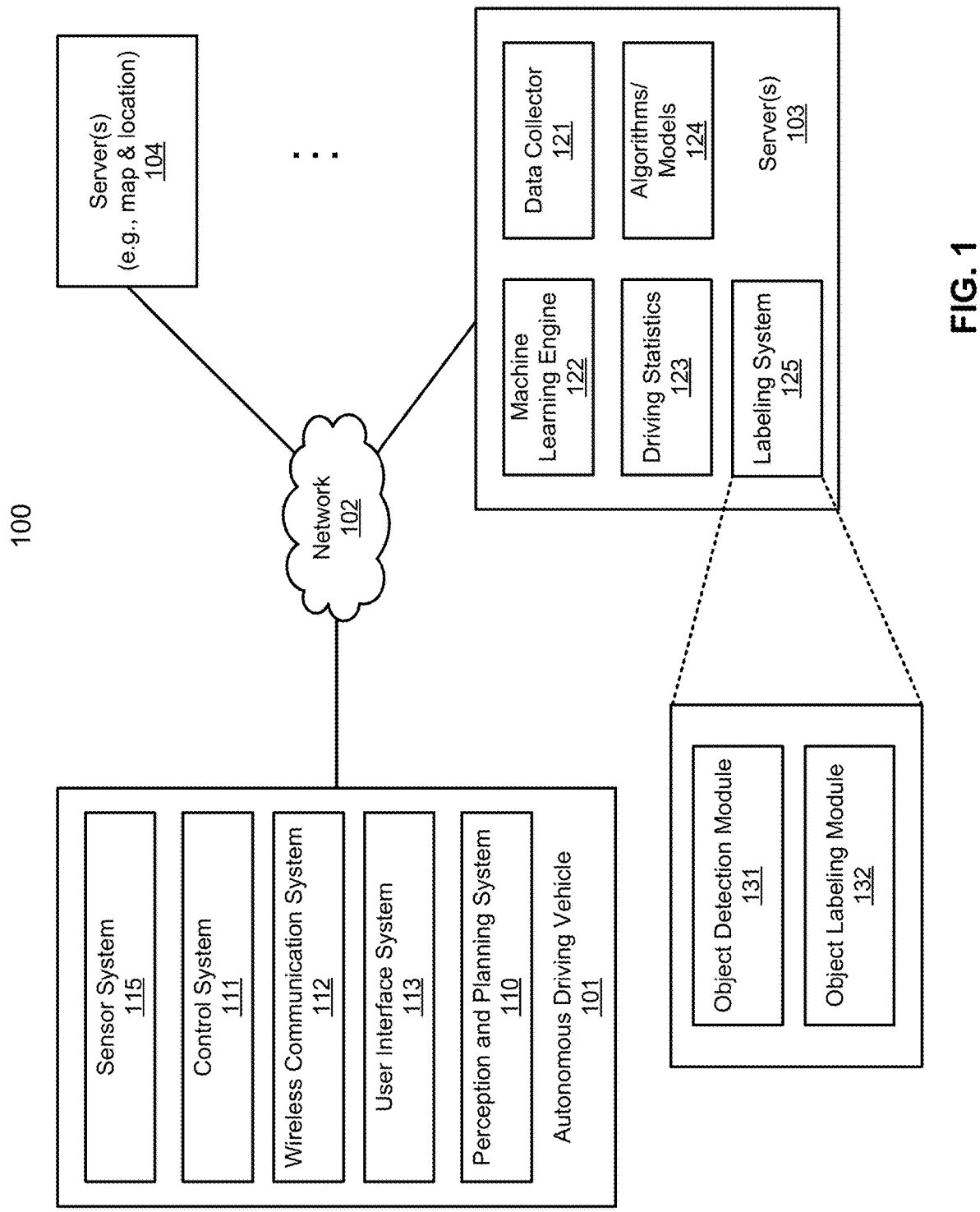
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, sensor data (e.g., images, point clouds) may be recorded and stored in a persistent storage device during the driving of a variety of vehicles. The sensor data can then be utilized offline to label or annotate certain objects that have been detected based on the "trails" of the sensor data automatically without user intervention. In one embodiment, if an image (e.g. a camera image or a point cloud image) includes an object detected by an object detector, the labeling system "walks" back and traverses other images to identify the counterpart object equivalent to the detected object and labels the counterpart object, which cannot be detected by the object detector at the point in time in the past (e.g., the object is too small, blur, or partially or fully occluded at the time). Similarly, for example, lane lines can also be interpolated or connected based on the images captured chronologically. As a result, the conventional manual tedious labeling processes can be reduced.

According to one embodiment, a list of images (e.g., images captured by a camera, a LIDAR device, and/or a RADAR device) is received. The images were captured by a sensor of an ADV chronologically while driving through a driving environment. A first image of the images is identified that includes a first object in a first dimension (e.g., larger size) detected by an object detector using an object detection algorithm. In response to the detection of the first object, the images in the list are traversed backwardly in time from the first image to identify a second image that includes a second object in a second dimension (e.g., smaller size) based on a moving trail of the ADV represented by the list of images. The second object is then labeled or annotated in the second image equivalent to the first object in the first image (referred to as a counterpart image to the first image). The list of images having the labeled second image can be utilized for subsequent object detection during autonomous driving.

In one embodiment, the object detection algorithm may be trained using the list of images including the second image annotated therein. The first object may represent a lane marking such as a lane line of a lane in which the ADV is driving or the first object may represent an obstacle near the ADV. The first image was captured at a first point in time and the second image was captured at a second point in time that was prior to the first point in time.

In one embodiment, the first object in the first dimension in the first image represents a closer view from the ADV detectable by the object detector. The second object in the second dimension of the second image represents a farther view from the ADV that is undetectable by the object detector using the object detection algorithm. The second object of the second image is identified as equivalent to the first object of the first image by tracking relative positions of a corresponding object in one or more images between the first image and the second image in the list. In one embodiment, the first object in the first image was detected online while the ADV is driving through the driving environment and the second object of the second image is detected offline by traversing the images in the list.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
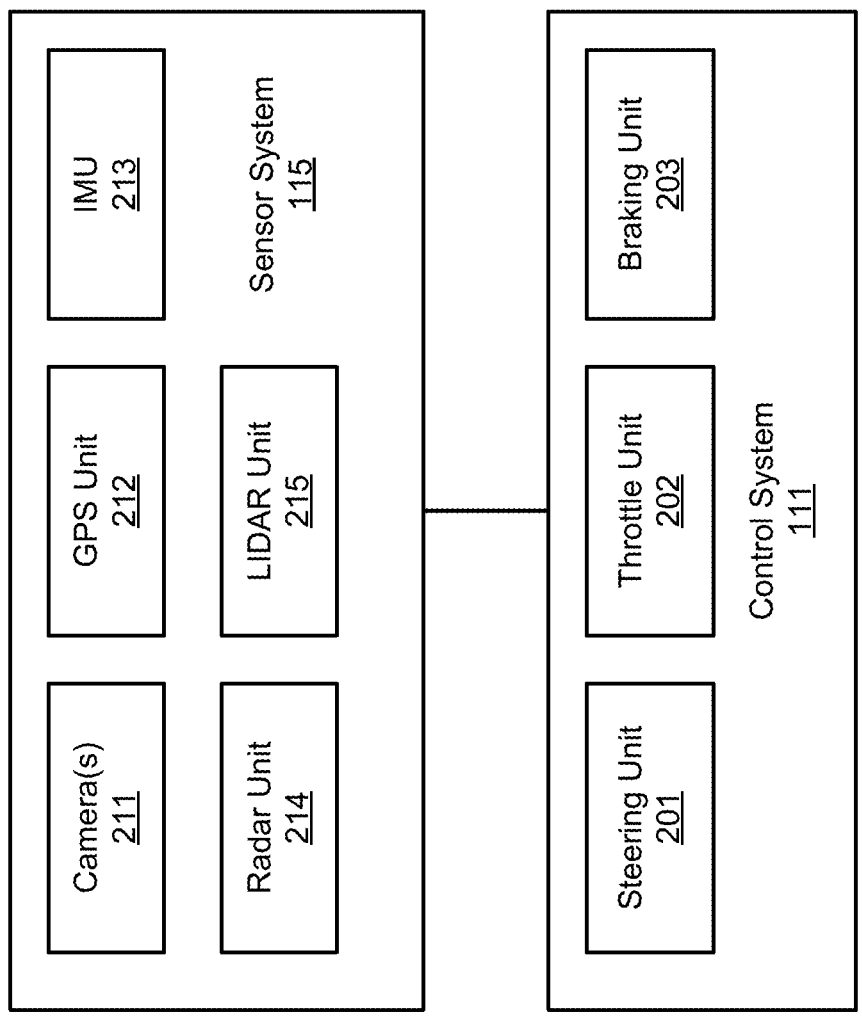
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms to automatically label or annotate objects in the images captured by one or more sensors of an ADV. Algorithms 124 can then be uploaded on ADVs to be utilized during autonomous driving in real-time. Server 103 may further host a labeling system 125 that is configured to automatically label the objects in the images captured by ADVs, which will be described in details further below.

Figure 3A:
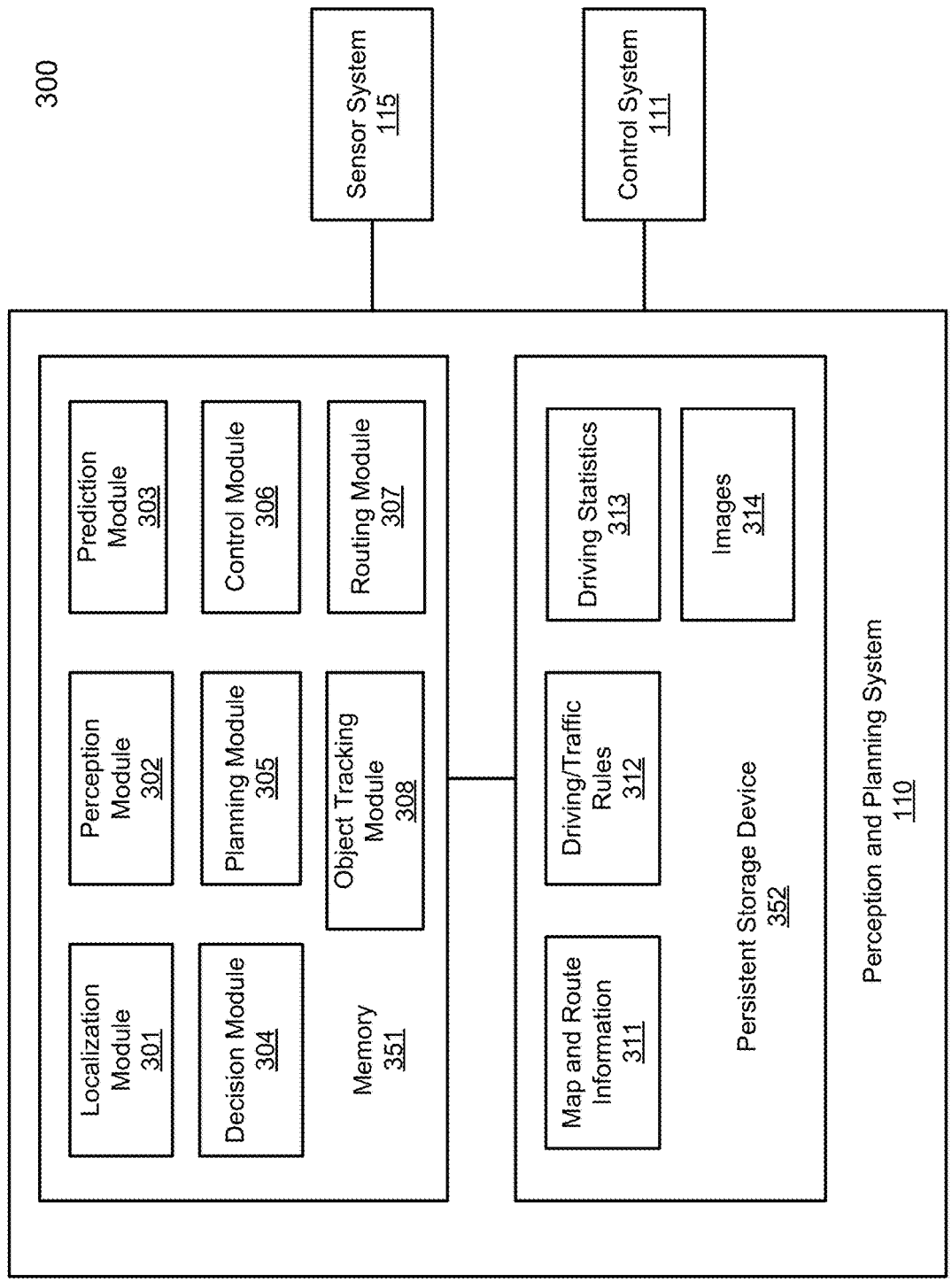
FIGS. 3A-3B are block diagrams illustrating an example of a perception and planning system used with an autonomous vehicle according to one embodiment.
Figure 3B:
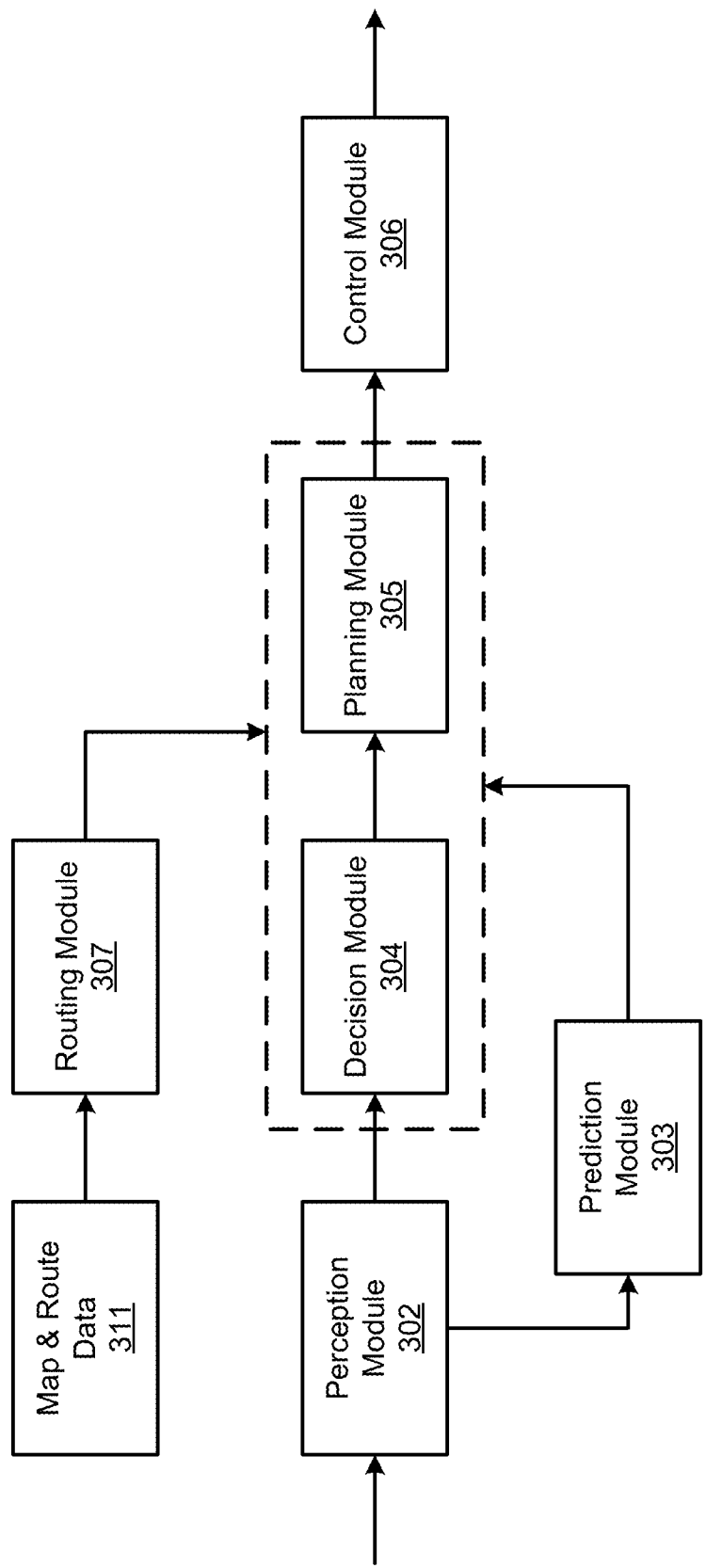

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and object tracking module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, intersection, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, object tracking module 308 is configured to track the movement history of obstacles detected by perception module 302, as well as the movement history of the ADV. Alternatively, object tracking module 308 includes an object detector to detect and recognize a static object and to label the detected static object. Object tracking module 308 may be implemented as part of perception module 302. The movement history of obstacles and the ADV may be stored in respective obstacle and vehicle state buffers maintained in memory 351 and/or persistent storage device 352 as part of driving statistics 313. For each obstacle detected by perception module 302, obstacles states at different points in time over a predetermined time period is determined and maintained in an obstacle state buffer associated with the obstacle maintained in memory 351 for quick access. The obstacle states may further be flushed and stored in persistent storage device 352 as a part of driving statistics 313. The obstacle states maintained in memory 351 may maintained for a shorter time period, while the obstacles states stored in persistent storage device 352 may be maintained for a longer time period. Similarly, the vehicle states of the ADV can also be maintained in both memory 351 and persistent storage device 352 as a part of driving statistics 313.

In addition, the images captured by sensors of the ADV (e.g., cameras, LIDAR, RADAR) may be stored in persistent storage device 352 as part of images 314. Some of the images may include an object detected and annotated by object tracking module 308 and/or perception module 302. The images 314 may be analyzed offline by a data analytics system such as object labeling system 125 of server 103, for example, to automatically label or annotate objects that cannot be detected by the object detector online based on the ones capable of being detected by the object detector.

Figure 4:
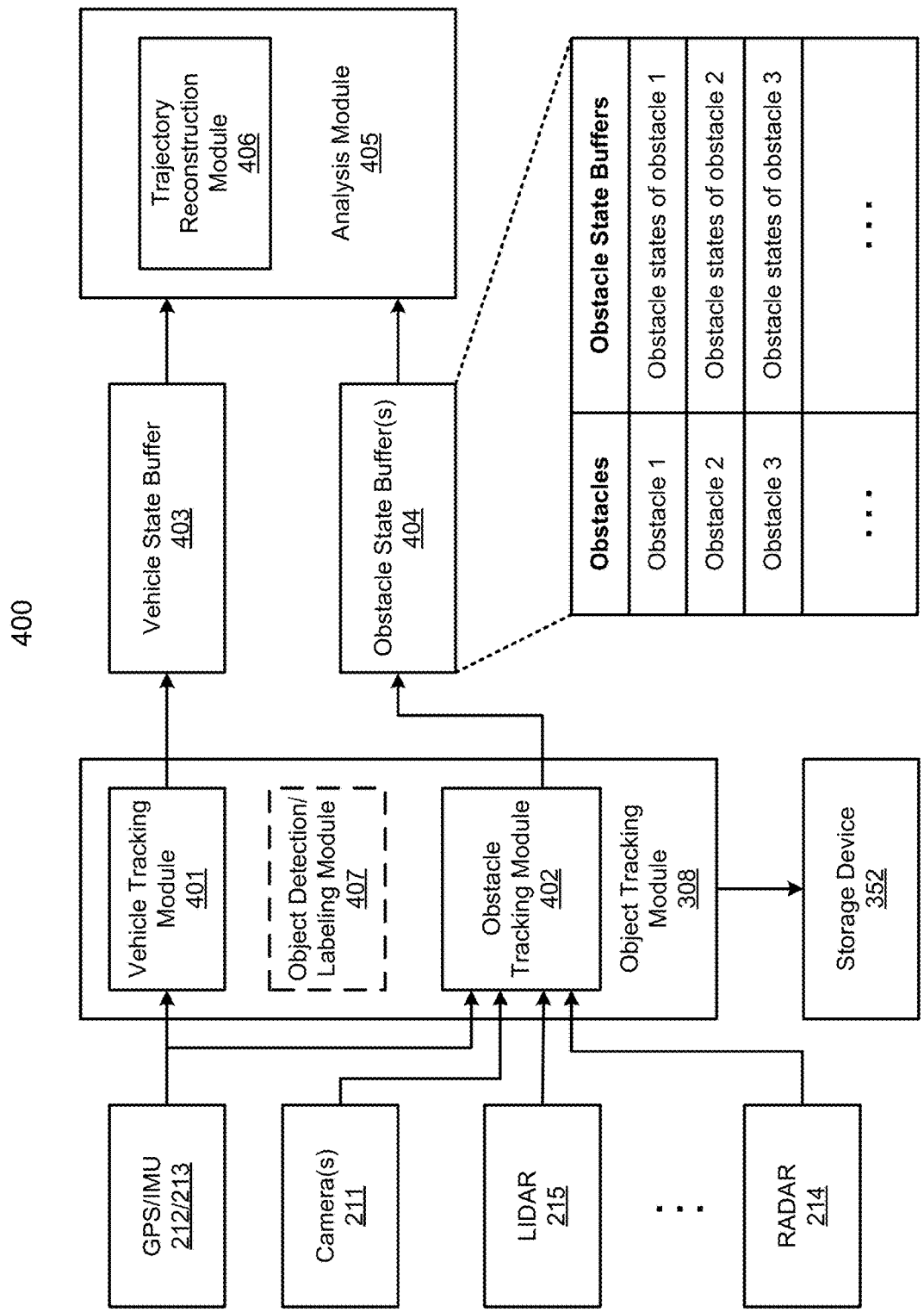
FIG. 4 is a block diagram illustrating an object detection and tracking system according to one embodiment.

FIG. 4 is a block diagram illustrating an object tracking system according to one embodiment. Referring to FIG. 4, object tracking module 308 includes vehicle tracking module 401 and obstacle tracking module 402, which may be implemented as an integrated module. Vehicle tracking module 401 is configured to track the movement of the ADV based on at least GPS signals received from GPS 212 and/or IMU signals received from IMU 213. Vehicle tracking module 401 may perform a motion estimation based on the GPS/IMU signals to determine the vehicle states such as locations, speeds, and heading directions at different points in time. The vehicle states are then stored in vehicle state buffer 403. In one embodiment, vehicle states stored in vehicle state buffer 403 may only contain the locations of the vehicle at different points in time with fixed time increments. Thus, based on the locations at the fixed incremented timestamps, the speed and the heading direction may be derived. Alternatively, a vehicle state may include a rich set of vehicle state metadata including, a location, speed, heading direction, acceleration/deceleration, as well as the control commands issued.

In one embodiment, obstacle tracking module 402 is configured to track the obstacles detected based on sensor data obtained from various sensors, such as, for example, cameras 211, LIDAR 215, and/or RADAR 214. Obstacle tracking module 402 may include a camera object detector/tracking module and a LIDAR object detector/tracking module to detect and track an obstacle captured by an image and an obstacle captured by a LIDAR point cloud respectively. A data fusion operation may be performed on the outputs provided by the camera and LIDAR object detector/tracking modules. In one embodiment, the camera and LIDAR object detector/tracking modules may be implemented in a neural network predictive model to predict and track the movements of the obstacles. The obstacle states of obstacles are then stored obstacle state buffers 404. An obstacle state is similar or identical to a vehicle state as described above.

In one embodiment, for each of the obstacles detected, an obstacle state buffer is allocated to specifically store the obstacle states of the corresponding obstacle. In one embodiment, each of the vehicle state buffer and obstacle state buffers is implemented as a circular buffer, similar to a first-in-first-out (FIFO) buffer, to maintain a predetermined amount of data associated with a predetermined time period. The obstacle states stored in the obstacle state buffers 404 can be utilized to predict future movements of the obstacles, such that a better path for the ADV can be planned to avoid the collision with the obstacles.

For example, under certain circumstances, an obstacle may be blocked by another object that the ADV cannot "see." However, based on the past obstacle states of the obstacle, a further moving trajectory may be predicted, even though the obstacle is out of sight. This is important because an obstacle may be in a blind spot for a moment and the ADV needs to plan by considering the future locations of the obstacle to avoid the potential collision. Alternatively, traffic flows or traffic congestion may be determined based on the trajectories of the obstacles.

According to one embodiment, the obstacle states of an obstacle over a period of time can be utilized to reconstruct a trajectory in the past the obstacle has moved. The reconstructed trajectories of one or more obstacles in the driving environment can be utilized to determine or predict the lane configuration of a road by creating a virtual lane. A lane configuration may include a number of lanes, a lane width, a lane shape or curvature, and/or a lane center line. For example, based on the traffic flows of multiple streams of obstacle flows, a number of lanes can be determined. In addition, an obstacle or moving object moves at the center of a lane in general. Thus by tracking the moving trajectory of an obstacle, a lane center line can be predicted. Further, a lane width can also be determined based on the predicted lane center line by observing the obstacle width plus a minimum clearance space required by the government regulation. Such lane configuration prediction is particular useful when the ADV is driving in a rural area, where the lane markings are unavailable or insufficiently clear.

According to another embodiment, if there is a need for following or tailgating another moving obstacle, the past moving trajectory of that obstacle can be reconstructed based on the obstacle states retrieved from the corresponding obstacle state buffer. A path for tailgating can then be planned based on the reconstructed trajectory of the obstacle to be followed.

According to one embodiment, object tracking module 308 may further include an object detection/labeling module 407. Module 407 is configured to detect an object in an image, recognize what kind of object that is, and to label the detected object in the image. Note that the object detection/labeling module 407 may be able to recognize an object when the object is near the ADV (e.g., larger and clearer). However, when the object is far away from the ADV, the object may appear smaller and the object detection/labeling module 407 may not be able to detect and recognize it. Thus, some of the images may include an object detected by the object detection/labeling module 407, while other images may not be detectable by the object detection/labeling module 407 even though the same object appears therein but in a smaller dimension. The images are then stored in persistent storage device 352 as part of images 314, which may be analyzed offline for automatic labeling, for example, by object labeling system 125 of FIG. 1.

Referring now to FIG. 1, in one embodiment, object labeling system 125 includes an object detection module 131 and an object labeling module 132. Given a list of images captured chronologically, object detection module 131 is configured to detect an object contained in an image or recognize an object previously detected and annotated (e.g., by object detection/labeling module 407 of FIG. 4). In response to the detection of a first object contained in a first image, labeling module 132 traverses the images in the list backwardly in time from the first image to identify a second image that includes a second object in a second dimension (e.g., smaller size) based on a moving trail of the ADV represented by the list of images. The second object is then labeled or annotated by the object labeling module 132 in the second image equivalent to the first object in the first image (referred to as a counterpart image to the first image). For example, if the object is recognized as a building, the labeling module 132 would indicate in the second image that the object is a building. The list of images having the labeled second image can be utilized for subsequent object detection during autonomous driving. The object labeling module 132 is configured to traverse backward for a predetermined number of images representing a predetermined time period or a predetermined distance (e.g., 200 meters).

In one embodiment, the object detection algorithm used by object detector 407 may be trained using the list of images including the second image annotated therein. The first object may represent a lane marking such as a lane line of a lane in which the ADV is driving or the first object may represent an obstacle neat the ADV. The first image was captured at a first point in time and the second image was captured at a second point in time that was prior to the first point in time.

In one embodiment, the first object in the first dimension in the first image represents a closer view from the ADV detectable by the object detector. The second object in the second dimension of the second image represents a farther view from the ADV that is undetectable by the object detector using the object detection algorithm. The second object of the second image is identified as equivalent to the first object of the first image by tracking relative positions of a corresponding object in one or more images between the first image and the second image in the list. In one embodiment, the first object in the first image was detected online while the ADV is driving through the driving environment and the second object of the second image is detected offline by traversing the images in the list.

Figure 5:
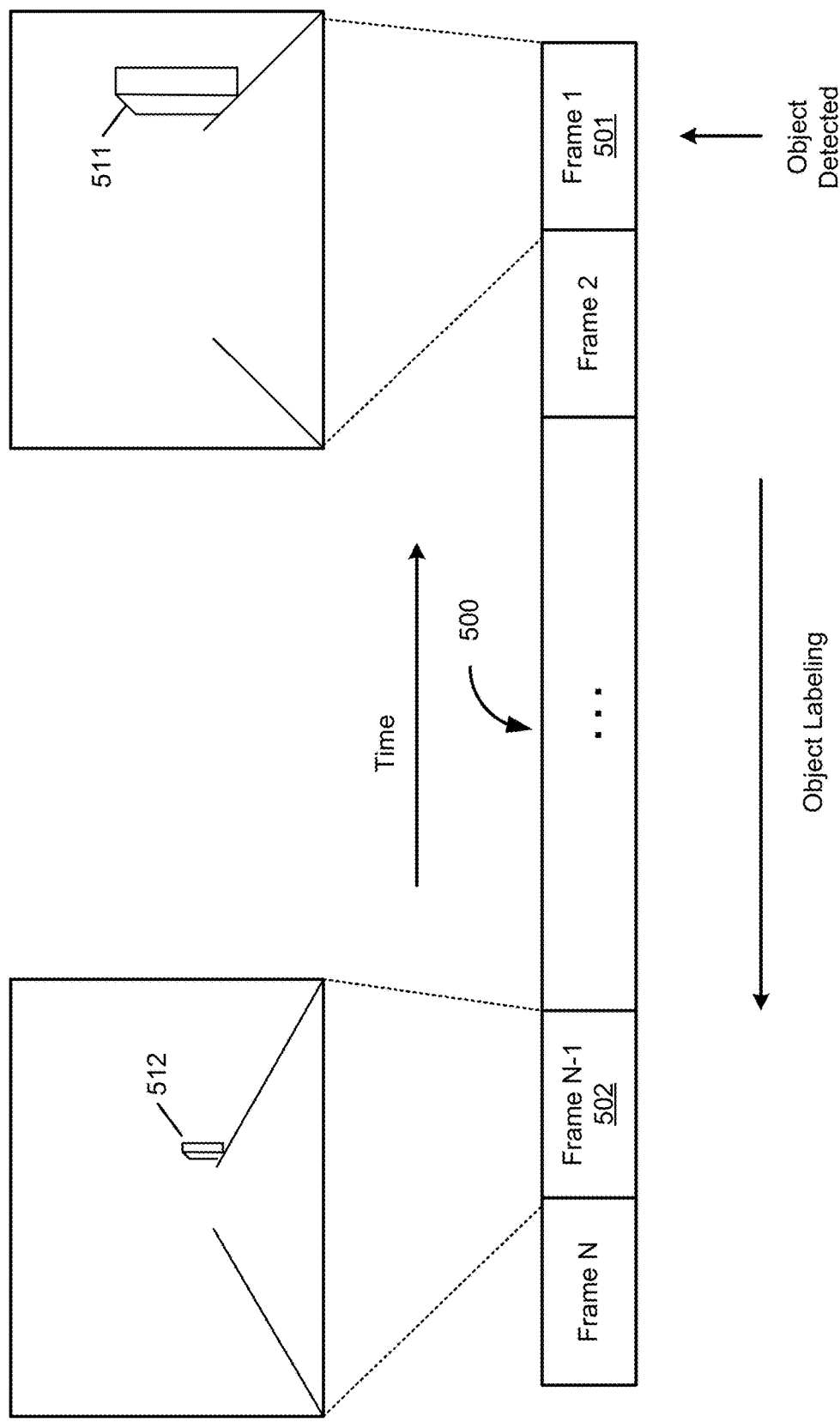
FIG. 5 is a block diagram illustrating a process of an automatic object labeling system according to one embodiment.

For the purpose of illustration, referring now to FIG. 5, given a list of images 500, object detection module 131 is configured to identify first image 501 containing an object 511 that is either detected by detection module 131 or previously detected by another object detector (e.g., object detector 407). Based on the first image 501, labeling module 132 traverses backwardly in time to identify a second image, in this example, image 502 containing a counterpart object 512 associated with detected object 511. As shown in FIG. 5, object 511 represents an object in a close view while object 512 represents the same object in a far view. Due to the smaller size of object 512, an online object detector may not be able to detect it. By automatically traversing through the images backwardly in time, the system is able to identify and label object 512 as a counterpart object to object 511. The list of images 500 having at least object 512 labeled can be used to train an object detector subsequently.

Figure 6B:
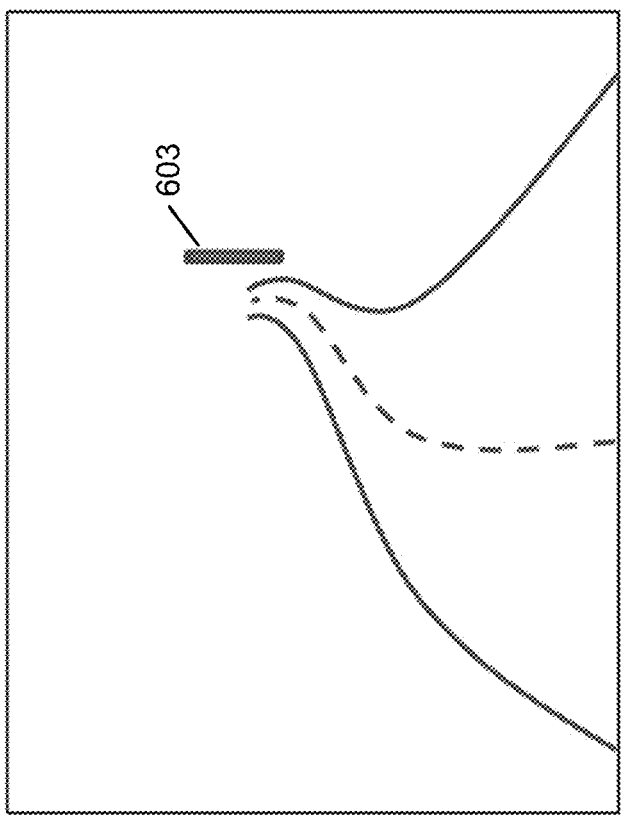
FIGS. 6A and 6B are view diagrams illustrating a process of labeling objects according to one embodiment.
Figure 6A:
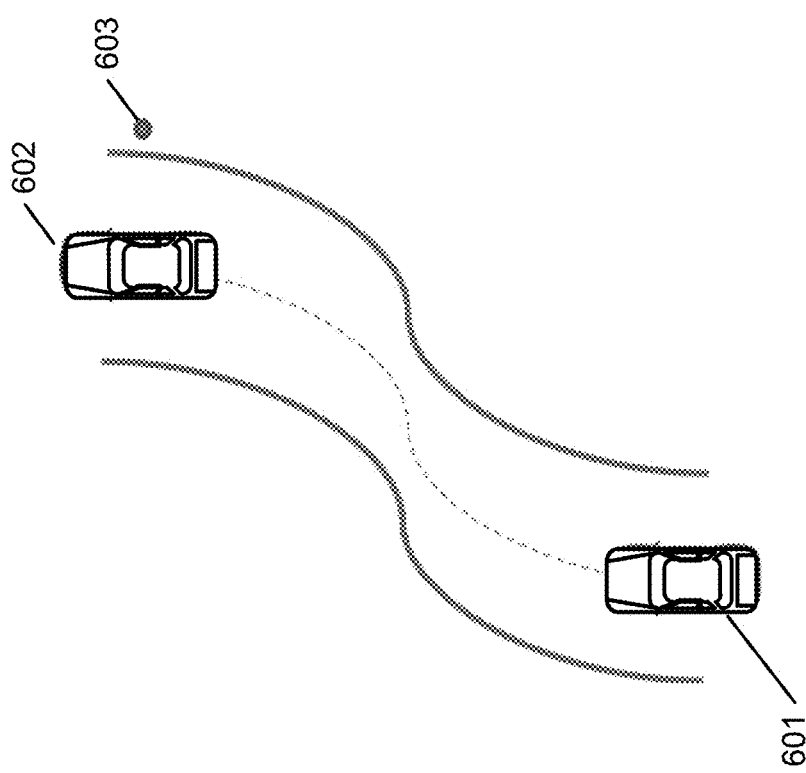

FIGS. 6A and 6B show different views of a driving environment according to one embodiment. FIG. 6A is a top-down view and FIG. 6B represents an image view. Referring to FIG. 6A, during the autonomous driving, the movement history of an ADV is recorded, for example from point 601 to 602 and stored in a persistent storage device as described above. When object 603 is detected, the automatic labeling system "walks" backwardly in time from point 602 towards point 601 for a predetermined distance (e.g., 200 meters from point 602) to retroactively label the same object in those images that could not be labeled, for example, due to small size, partially or fully occluded.

Figure 7:
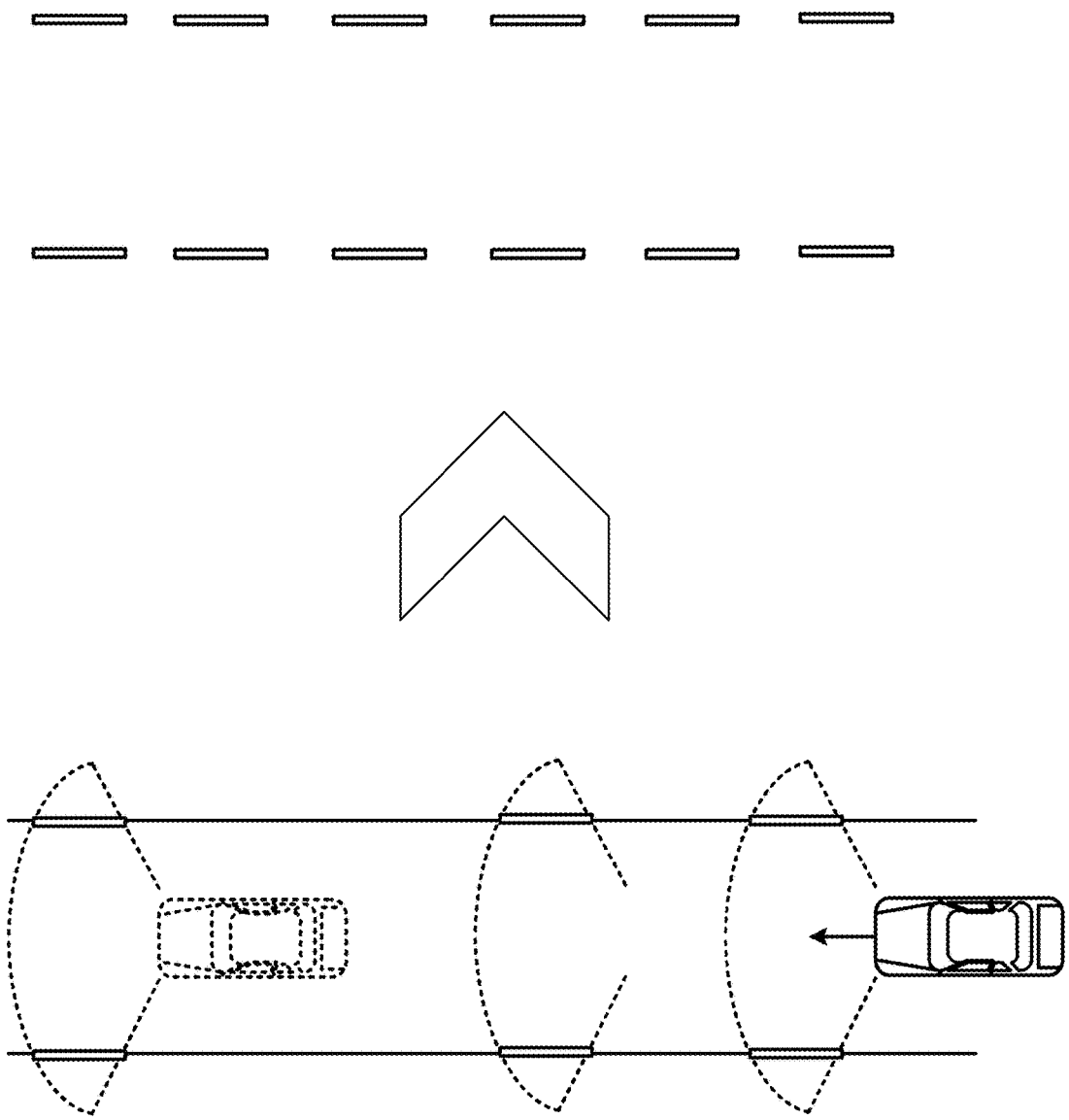
FIG. 7 is a block diagram illustrating a process of an automatic lane line labeling system according to one embodiment.
Figure 8A:
FIGS. 8A and 8B are screenshots illustrating an automatic lane line labeling process according to certain embodiments.
Figure 8B:

Similarly, the automatic labeling system 125 may also be utilized to label lane lines as shown in FIG. 7. Referring now to FIG. 7, when an ADV is driving through a lane, the sensors may be able to detect and recognize segments of lane lines in a near view such as lane line segments represented by thicker segments. The captured images can then be analyzed offline as described to "connect" the lane line segments to form a continuous lane line. Such a technique is typically useful when a lane is a curve lane in which a portion of the lane lines are hidden by blocked by an obstacle in front as shown in FIG. 8A. Referring to FIG. 8A, the curved lane lines are blocked by the vehicle in front. By traversing the sequence of images, the hidden lane lines or blocked lane lines can be identified and annotated, also as shown in FIG. 8B. Referring to FIG. 8B, the farther portion of the lane lines are blocked by a vehicle in front, but the lane lines can be identified and labeled by the object labeling system as described above.

Figure 9:
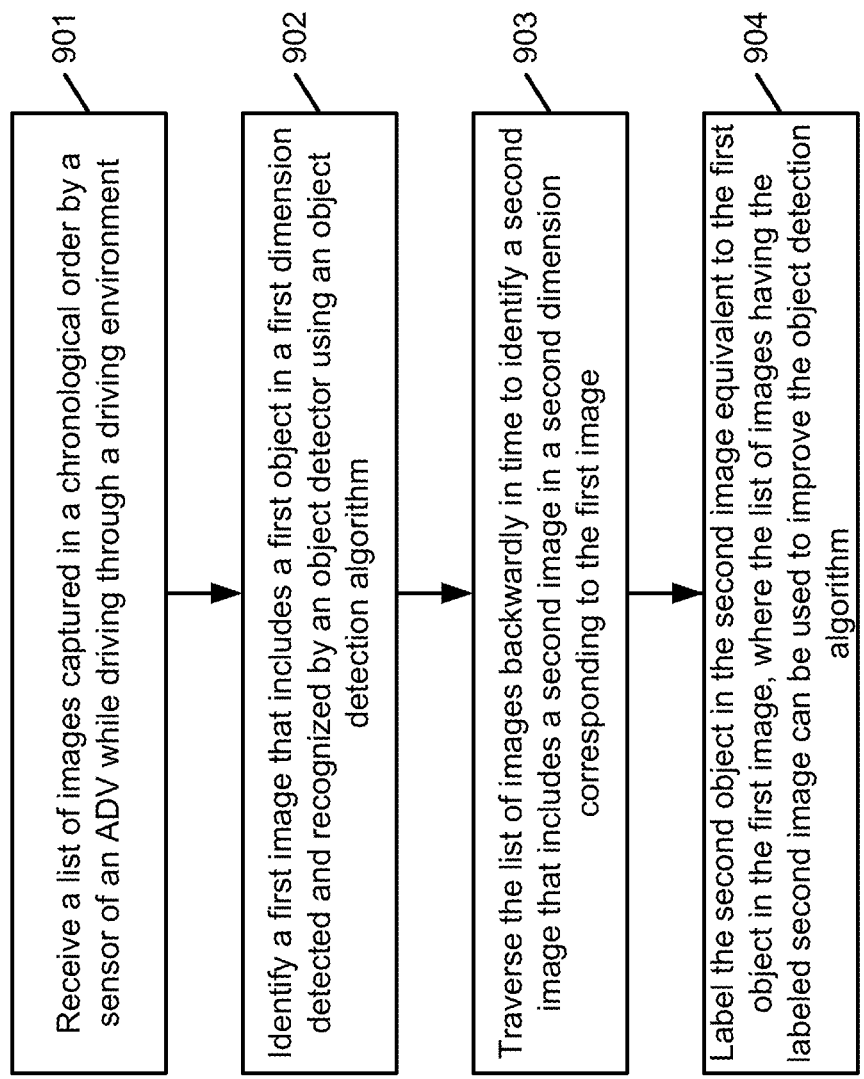
FIG. 9 is a flow diagram illustrating a process of automatic object labeling according to one embodiment.

FIG. 9 is a flow diagram illustrating an example of a process of labeling objects according to one embodiment. Process 900 may be performed by processing logic which may include software, hardware, or a combination thereof. For example process 900 may be performed by object labeling system 125. Referring to FIG. 9, at block 901, processing logic receives a list of images captured in a chronological order. Each of the images was captured by a sensor mounted on an ADV while driving through a driving environment. At block 902, processing logic identifies a first image that includes a first object in a first dimension (e.g., larger size) detected and recognized by an object detector based on the first image using an object detection algorithm. In response to the first object, at block 903, processing logic traverses the images in the list backwardly in time to identify a second image that includes a second object in a second dimension (e.g., smaller size) based on a moving trail of the ADV represented by the list of images. At block 904, the second object is labeled in the second image equivalent to the first object in the first image. The list of images having the labeled second image can be utilized for subsequent object detection during autonomous driving.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for labeling objects for autonomous driving, the method comprising:
   receiving a list of images captured in a chronological order, wherein each of the images was captured by a sensor mounted on an autonomous driving vehicle (ADV) while driving through a driving environment;
   identifying a first image of the images that includes a first object in a first dimension detected and recognized by an object detector based on the first image using an object detection algorithm; and
   in response to the identified first object,
      traversing the images in the list backwardly in time for a predetermined number of images within a predetermined time period to identify a second image that includes a second object in a second dimension based on a moving trail of the ADV represented by the list of images,
      determining a lane configuration of a road by creating a virtual lane, wherein the lane configuration includes a number of lanes, a lane width, a lane shape and curvature, and a lane center line, wherein the determining the lane configuration of the road further comprises:
         determining the number of lanes based on traffic flows of multiple streams of obstacle flows; and
         determining the lane center line by tracking a moving trajectory of an obstacle, and
      labeling the second object in the second image equivalent to the first object in the first image based on the lane configuration and the moving trail of the ADV automatically without user intervention, wherein the first object was detected and annotated in the first image online while the ADV was driving, wherein the second object is identified and labeled by traversing the list of images offline, wherein the list of images having the labeled second image is utilized for a subsequent object detection during autonomous driving.

2. The method of claim 1, further comprising training the object detection algorithm using at least a portion of the images in the list including the labeled first object.

3. The method of claim 2, wherein the object detection algorithm is utilized to detect in an image an object with a smaller size, partially or fully occluded.

4. The method of claim 1, wherein the first object represents a lane marking of a lane in which the ADV was driving or an obstacle near the ADV.

5. The method of claim 4, wherein the first object represents a traffic sign, a traffic light, a vertical pole, an intersection, or a cross walk.

6. The method of claim 1, wherein the first image was captured at a first point in time and the second image was captured at a second point in time that was before the first point in time.

7. The method of claim 6, wherein the first object in the first dimension in the first image represents a closer view from the ADV detectable by the object detector, and wherein the second object in the second dimension in the second image represents a farther view from the ADV that is undetectable by the object detector using the object detection algorithm.

8. The method of claim 6, wherein the second object of the second image is identified as equivalent to the first object of the first image by tracking relative positions of a corresponding object in one or more images between the first image and the second image in the list.

9. The method of claim 1, wherein the list of images were stored in a persistent storage device of the ADV.

10. A non-transitory machine-readable medium having instructions stored therein, which when executed by a processor, cause the processor to perform operations, the operations comprising:
   receiving a list of images captured in a chronological order, wherein each of the images was captured by a sensor mounted on an autonomous driving vehicle (ADV) while driving through a driving environment;
   identifying a first image of the images that includes a first object in a first dimension detected and recognized by an object detector based on the first image using an object detection algorithm; and
   in response to the identified first object,
      traversing the images in the list backwardly in time for a predetermined number of images within a predetermined time period to identify a second image that includes a second object in a second dimension based on a moving trail of the ADV represented by the list of images,
      determining a lane configuration of a road by creating a virtual lane, wherein the lane configuration includes a number of lanes, a lane width, a lane shape and curvature, and a lane center line, wherein the determining the lane configuration of the road further comprises: determining the number of lanes based on traffic flows of multiple streams of obstacle flows; and
      determining the lane center line by tracking a moving trajectory of an obstacle, and
   labeling the second object in the second image equivalent to the first object in the first image based on the lane configuration and the moving trail of the ADV automatically without user intervention, wherein the first object was detected and annotated in the first image online while the ADV was driving, wherein the second object is identified and labeled by traversing the list of images offline, wherein the list of images having the labeled second image is utilized for a subsequent object detection during autonomous driving.

11. The machine-readable medium of claim 10, wherein the operations further comprise training the object detection algorithm using at least a portion of the images in the list including the labeled first object.

12. The machine-readable medium of claim 11, wherein the object detection algorithm is utilized to detect in an image an object with a smaller size, partially or fully occluded.

13. The machine-readable medium of claim 10, wherein the first object represents a lane marking of a lane in which the ADV was driving or an obstacle near the ADV.

14. The machine-readable medium of claim 13, wherein the first object represents a traffic sign, a traffic light, a vertical pole, an intersection, or a cross walk.

15. The machine-readable medium of claim 10, wherein the first image was captured at a first point in time and the second image was captured at a second point in time that was before the first point in time.

16. The machine-readable medium of claim 15, wherein the first object in the first dimension in the first image represents a closer view from the ADV detectable by the object detector, and wherein the second object in the second dimension in the second image represents a farther view from the ADV that is undetectable by the object detector using the object detection algorithm.

17. The machine-readable medium of claim 15, wherein the second object of the second image is identified as equivalent to the first object of the first image by tracking relative positions of a corresponding object in one or more images between the first image and the second image in the list.

18. The machine-readable medium of claim 10, wherein the list of images were stored in a persistent storage device of the ADV.

19. A data processing system, comprising:
a processor; and
a memory coupled to the processor to store instructions, which when executed by the processor, cause the processor to perform operations, the operations including receiving a list of images captured in a chronological order, wherein each of the images was captured by a sensor mounted on an autonomous driving vehicle (ADV) while driving through a driving environment;
identifying a first image of the images that includes a first object in a first dimension detected and recognized by an object detector based on the first image using an object detection algorithm; and
in response to the identified first object,
traversing the images in the list backwardly in time for a predetermined number of images within a predetermined time period to identify a second image that includes a second object in a second dimension based on a moving trail of the ADV represented by the list of images,
determining a lane configuration of a road by creating a virtual lane, wherein the lane configuration includes a number of lanes, a lane width, a lane shape and curvature, and a lane center line, wherein the determining the lane configuration of the road further comprises:
determining the number of lanes based on traffic flows of multiple streams of obstacle flows; and
determining the lane center line by tracking a moving trajectory of an obstacle, and
labeling the second object in the second image equivalent to the first object in the first image based on the lane configuration and the moving trail of the ADV automatically without user intervention, wherein the first object was detected and annotated in the first image online while the ADV was driving, wherein the second object is identified and labeled by traversing the list of images offline, wherein the list of images having the labeled second image is utilized for a subsequent object detection during autonomous driving.

20. The system of claim 19, wherein the operations further comprise training the object detection algorithm using at least a portion of the images in the list including the labeled first object.

* * * * *